(12) United States Patent
Horng

(10) Patent No.: US 6,400,054 B1
(45) Date of Patent: Jun. 4, 2002

(54) FIXING STRUCTURE FOR AN AXLE TUBE OF A MOTOR

(75) Inventor: Yin-Rong Horng, Kaohsiung (TW)

(73) Assignee: NS Motor Technology Co., Ltd., Kaohsiung (TW)

( * ) Notice: Subject to any disclaimer, the term of this patent is extended or adjusted under 35 U.S.C. 154(b) by 0 days.

(21) Appl. No.: 09/776,666

(22) Filed: Feb. 6, 2001

(51) Int. Cl.[7] .............................. H02K 7/00; H02K 5/00
(52) U.S. Cl. ......................... 310/91; 310/42; 310/67 R
(58) Field of Search ................................ 310/42, 67 R, 310/90, 91, 254, 258; 29/596–598; 360/99.08, 98.07, 99.04; 417/423.1, 423.12, 423.7, 354

(56) References Cited

U.S. PATENT DOCUMENTS

| | | | | |
|---|---|---|---|---|
| 4,164,690 A | * | 8/1979 | Muller et al. ................. | 310/63 |
| 4,987,331 A | * | 1/1991 | Horng ........................ | 310/254 |
| 5,245,236 A | * | 9/1993 | Horng ........................ | 310/91 |
| 5,947,704 A | * | 9/1999 | Hsieh ..................... | 417/423.12 |
| 6,050,785 A | * | 4/2000 | Horng ........................ | 417/354 |
| 6,121,710 A | * | 9/2000 | Ho ............................. | 310/254 |

* cited by examiner

Primary Examiner—Tran Nguyen
(74) Attorney, Agent, or Firm—Bacon & Thomas, PLLC

(57) ABSTRACT

A fixing structure for an axle tube of a motor comprises a support member including an assembly hole through which a relatively smaller outer diameter portion of an outer periphery of an end cap extends. The end cap includes a relatively larger outer diameter portion having an end face abutting against a lower side of the support member. The relatively smaller outer diameter portion of the end cap is extended through the assembly hole of the axle tube and engaged with a relatively larger inner diameter portion of an axle tube that further includes a relatively smaller inner diameter portion in which a bearing is secured. An end face of the axle tube abuts against an upper side of the support member while the relatively larger outer diameter portion of the end cap abuts against the lower side of the support member, thereby sandwiching the support member.

10 Claims, 6 Drawing Sheets

FIXING STRUCTURE FOR AN AXLE TUBE OF A MOTOR

BACKGROUND OF THE INVENTION

1. Field of the Invention

The present invention relates to a fixing structure for an axle tube of a motor, wherein the axle tube can be fixed easily and a longitudinal central axis of the axle tube is orthogonal to a plane on which the support member for the axle tube locates, thereby providing stable and non-tilt rotation for the rotor.

2. Description of the Related Art

FIGS. 1 and 2 illustrate a conventional motor comprising a metal plate 90 that is punched to form a tube 901 around which a circuit board 91 and a stator bobbin 92 are mounted. An axle tube 93 is extended through the circuit board 91 and the stator bobbin 92 and mounted into the tube 901. The axle tube 93 includes a bearing 931 mounted therein for rotatably holding a shaft 941 of a rotor 94. The shaft 941 extending through the bearing 931 is retained in place by a retaining element, such as a C-clip 95. A distal end of the shaft 94 rests on a bottom wall of an end cap 96 secured in an end of the axle tube 93.

In such a conventional motor, the tube 901 must be formed by punching. In addition, the tube 901 must be in an extremely tight engagement with the axle tube 93 by powerful punching. This requires highly precise punching device 2 to accomplish the extremely tight engagement between the axle tube 93 and the tube 901 after they are engaged. If the tube 901 is not in extremely tight engagement with the axle tube 93, the shaft 941 of the rotor 94 supported in the axle tube 93 will wobble while rotating. In addition, the longitudinal axis of the axle tube 93 must be exactly orthogonal to a plane on which the metal plate 90 locates. Otherwise, the rotor 94 cannot rotate in a stable and balanced state and noise is generated and the longevity thereof is shortened. In a case that the tube 901 is made from plastic material, the axle tube 93 and the tube 901 may be loosened from each other or even damaged after they are punched, as the axle tube 93 and the tube 901 are made from different material and thus have different heat-expansion coefficients. In addition, the axle tube 93 and the tube 901 are engaged in a way that is difficult to keep the rotor 94 rotating in a stable state after the rotor 94 is mounted in the bearing 931 in the axle tube 93.

SUMMARY OF THE INVENTION

It is the primary object of the present invention to provide a fixing structure for an axle tube of a motor, wherein the axle tube can be fixed easily and a longitudinal central axis of the axle tube is orthogonal to a plane on which the support member for the axle tube locates.

A fixing structure for an axle tube of a motor comprises a support member including an assembly hole through which a relatively smaller outer diameter portion of an outer periphery of an end cap extends. The end cap includes a relatively larger outer diameter portion having an end face abutting against a lower side of the support member. The relatively smaller outer diameter portion of the end cap is extended through the assembly hole of the axle tube and engaged with a relatively larger inner diameter portion of an axle tube that further includes a relatively smaller inner diameter portion in which a bearing is secured. An end face of the axle tube abuts against an upper side of the support member while the relatively larger outer diameter portion of the end cap abuts against the lower side of the support member, thereby sandwiching the support member.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
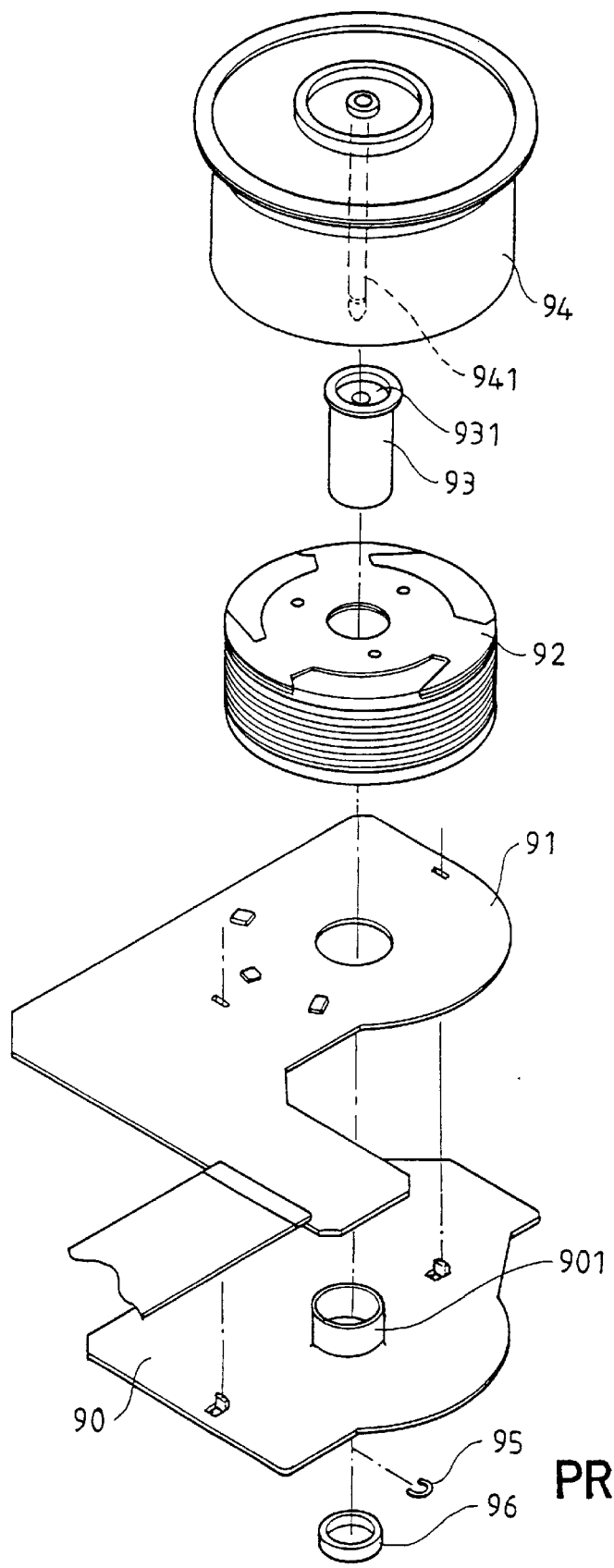
FIG. 1 is an exploded perspective view of a conventional motor.
Figure 2:
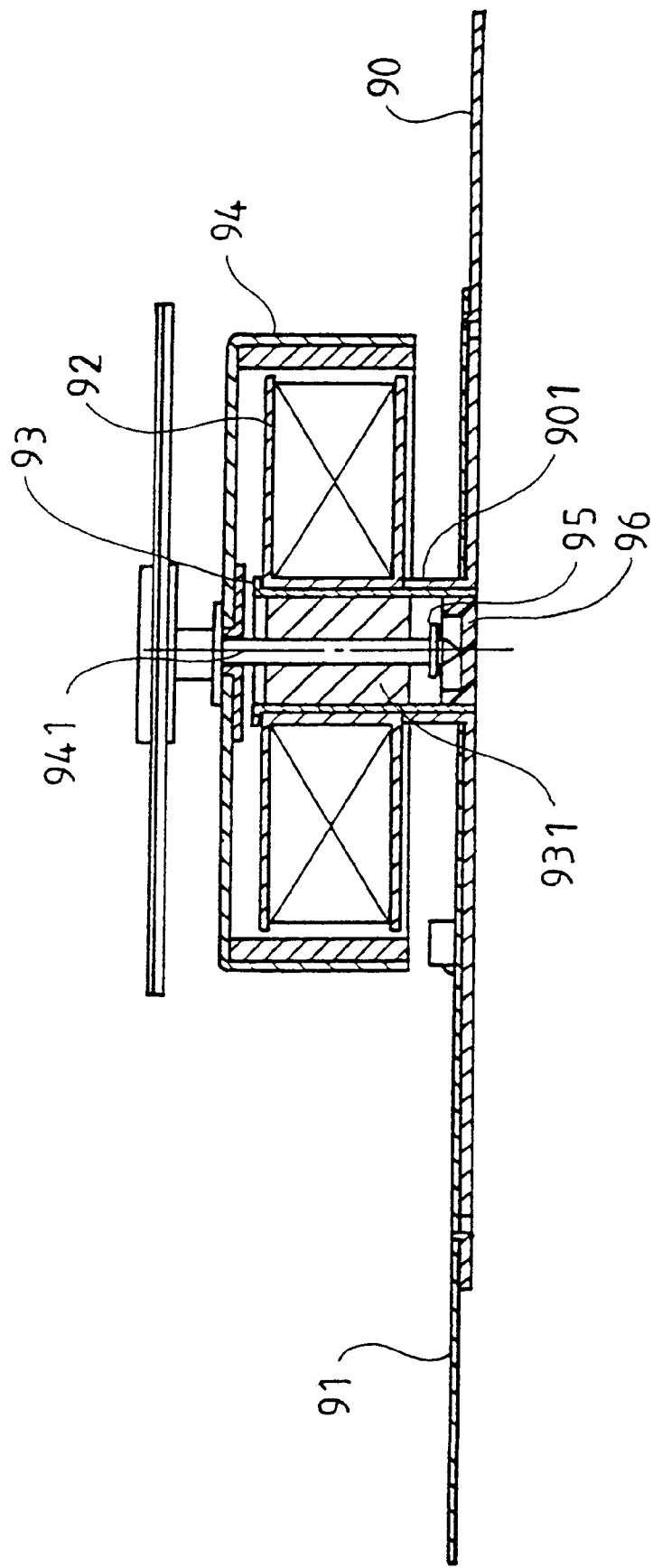
FIG. 2 is a sectional view of the conventional motor.
Figure 3:
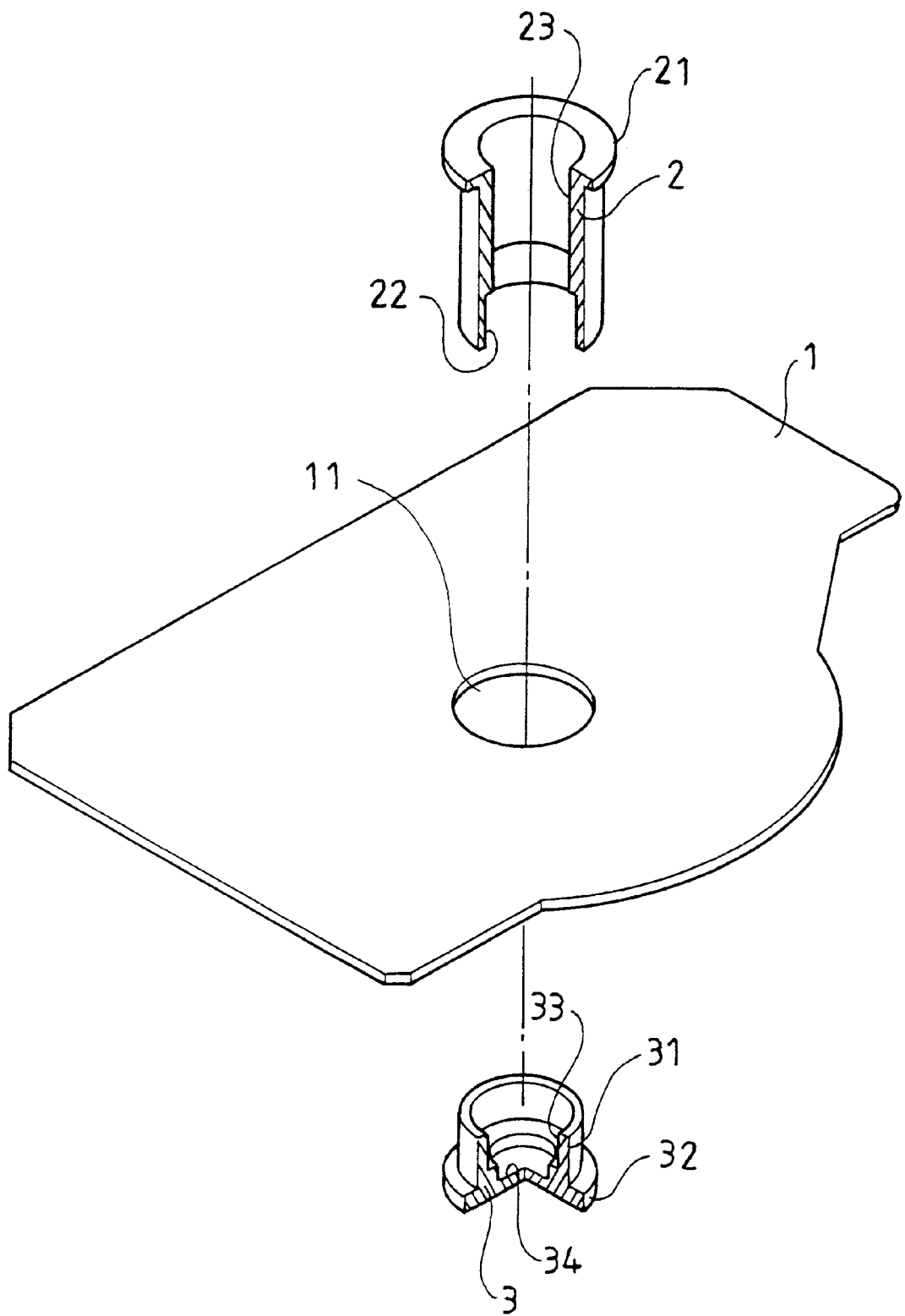
FIG. 3 is an exploded perspective view of a first embodiment of a fixing structure for an axle tube in accordance with the present invention.
Figure 4:
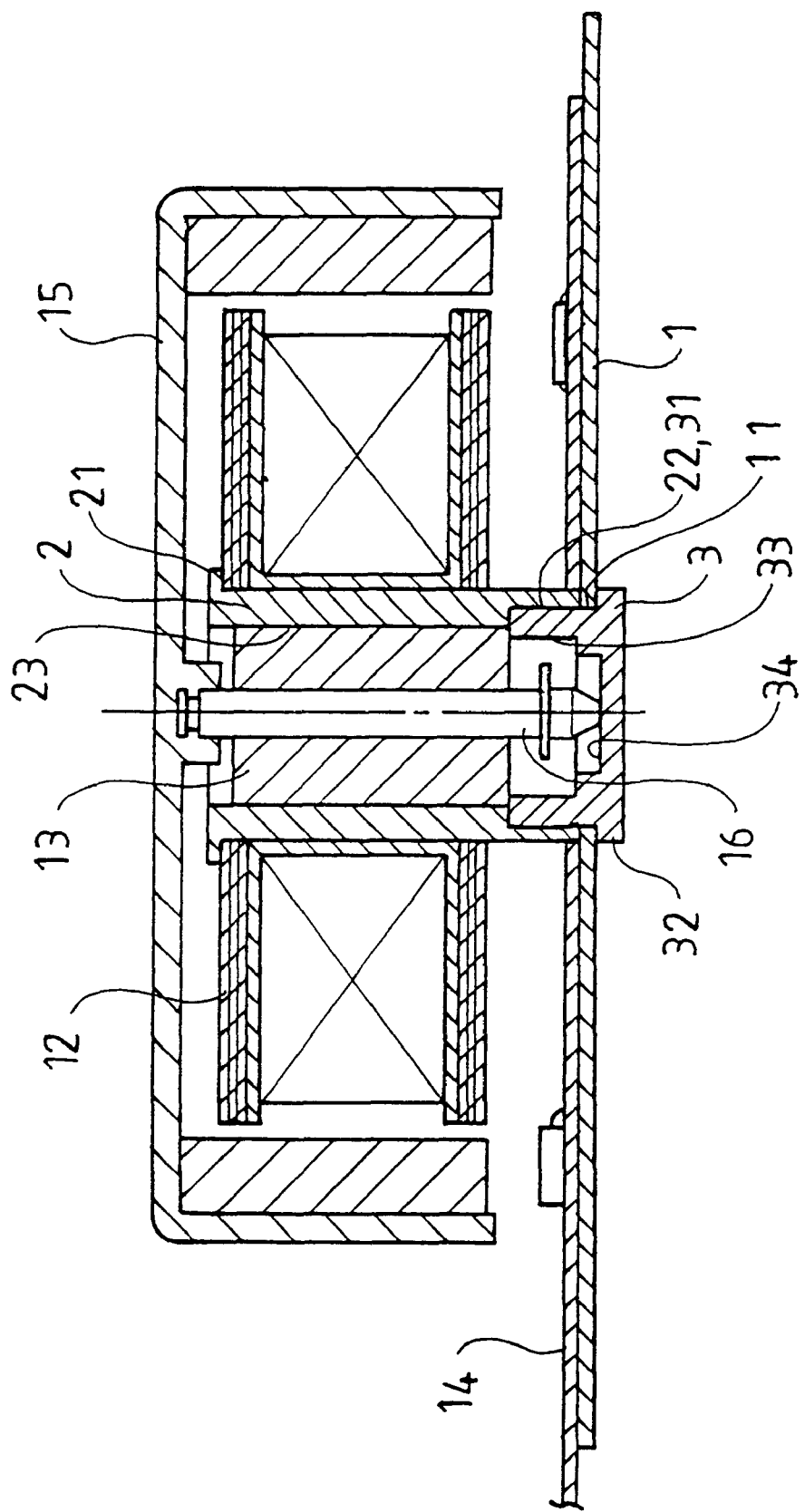
FIG. 4 is a sectional view of a motor with the fixing structure for an axle tube in FIG. 3.

FIGS. 3 and 4 illustrate a first embodiment of a fixing structure for an axle tube in accordance with the present invention and a sectional view of a motor with the fixing structure, respectively. As illustrated in FIG. 3, the fixing structure for an axle tube in accordance with the present invention generally includes a support member 1, an axle tube 2, and an end cap 3. The support member 1 is a plate made from metal or plastic material and includes an assembly hole 11 that is preferably circular.

The axle tube 2 is preferably made from metal and includes an outer diameter greater than the diameter of the assembly hole 11 of the support member 1. An end of the axle tube 2 abuts against an upper side of the support member 1. A flange 21 is formed on an outer periphery of the axle tube 2 for preventing disengagement of a stator bobbin 12 that is mounted around the axle tube 2. The axle tube 2 includes a step formed on an inner periphery thereof, thereby defining a relatively larger inner diameter portion 22 and a relatively smaller inner diameter portion 23. The relatively larger inner diameter portion 22 is contiguous to the upper side of the support member 1 and the relatively smaller inner diameter portion 23 is contiguous to the flange 21 formed on the other end of the axle tube 2.

The end cap 3 is made from metal that is identical to that for the axle tube 2. Preferably, the axle tube 2 and the end cap 3 are made from copper. The end cap 3 includes an outer periphery having a relatively smaller outer diameter portion 31 and a relatively larger outer diameter portion 32. The relatively smaller outer diameter portion 31 is extendible through the assembly hole 11 of the support member 1 and they have a minimum gap therebetween. In addition, the relatively smaller outer diameter portion 31 is extendible into the relatively larger inner diameter portion 22 of the axle tube 2 to have a tight engagement therebetween. The relatively larger outer diameter portion 32 is located on the other side of the support member 1. The end cap 3 includes an inner diameter portion 33 with an inner diameter the same as or smaller than the relatively smaller inner diameter portion 23 of the axle tube 2. A bearing 13 mounted in the relatively smaller inner diameter portion 23 of the axle tube 2 will rest on an annular end face of the end cap 3 in a case that the inner diameter of the end cap 3 is smaller than the relatively smaller inner diameter portion 23 of the axle tube 2, best shown in FIG. 4. The end cap 3 includes a bottom that serves a closed resting surface 34 on which the distal end of the shaft 16 of the rotor 15 rests.

As illustrated in FIG. 4, the relatively smaller outer diameter portion 31 of the end cap 3 is extended through the assembly hole 11 of the support member 1, and a circuit board 14 is mounted (superimposed) on the upper side of the support plate 1. The axle tube 2 is extended through the stator bobbin 12 with the relatively larger inner diameter portion 22 of the axle tube 2 engaging with the relatively smaller outer diameter portion 31 of the end cap 3. Thus, the end face of the relatively larger inner diameter portion 2 of the axle tube 2 abuts against the upper side of the support member 1 and the relatively larger outer diameter portion 32 of the end cap 3 abuts against the lower side of the support member 1. Thus, the support member 1 is sandwiched between the axle tube 2 and the end cap 3. Since the end cap 3 and the assembly hole 11 of the support member 1 have a minimum gap therebetween and the relatively smaller outer diameter portion 32 of the end cap 3 and the relatively larger inner portion 22 of the axle tube 2 have a tight engagement therebetween, a longitudinal central axis of the axle tube 2 is orthogonal to a plane on which the support member 1 for the axle tube 2 locates. As a result, a longitudinal axis of the shaft 16 of the rotor 15 rotatably held in the bearing 13 secured in the axle tube 2 is coincident with the longitudinal central axis of the axle tube 2 and thus orthogonal to the plane on which the support member 1 locates. Accordingly, the rotor 15 rotates in a stable and non-tilt state without generating noise.

Figure 5:
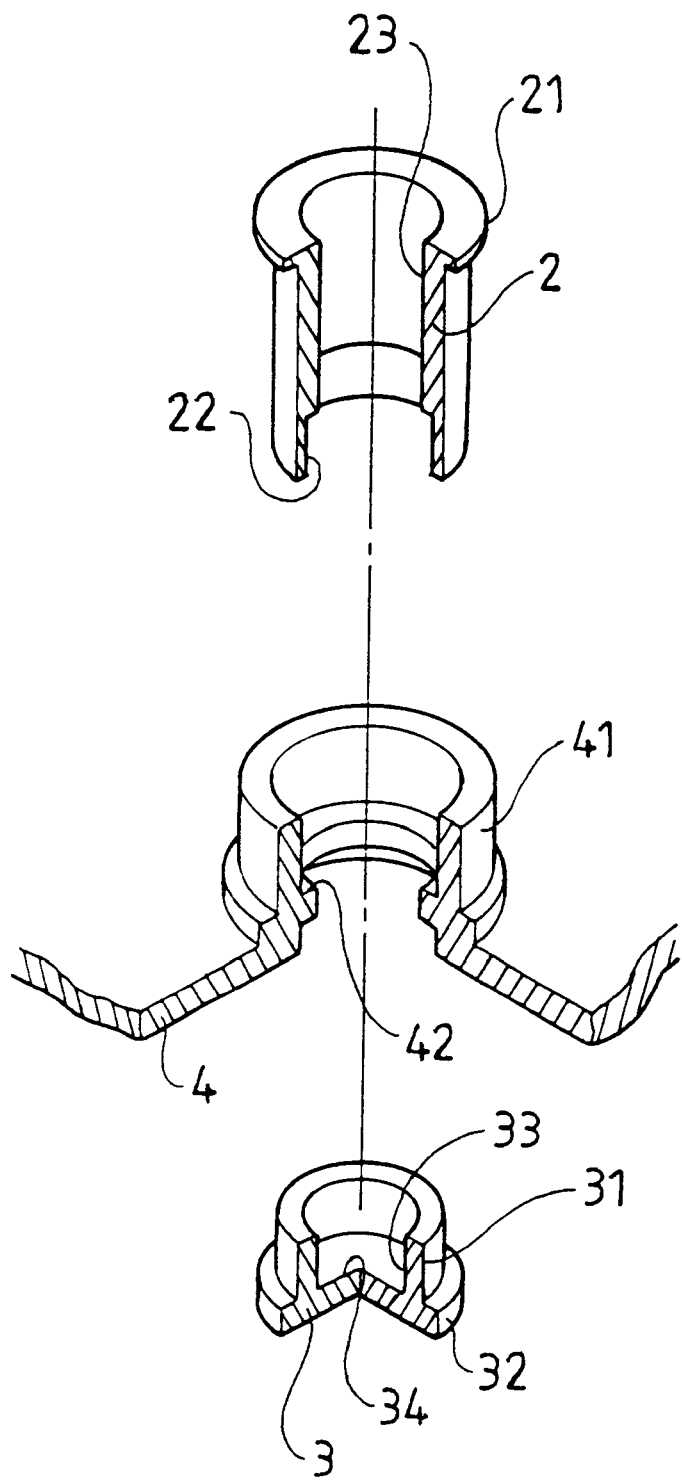
FIG. 5 is an exploded perspective view of a second embodiment of a fixing structure for an axle tube in accordance with the present invention.
Figure 6:
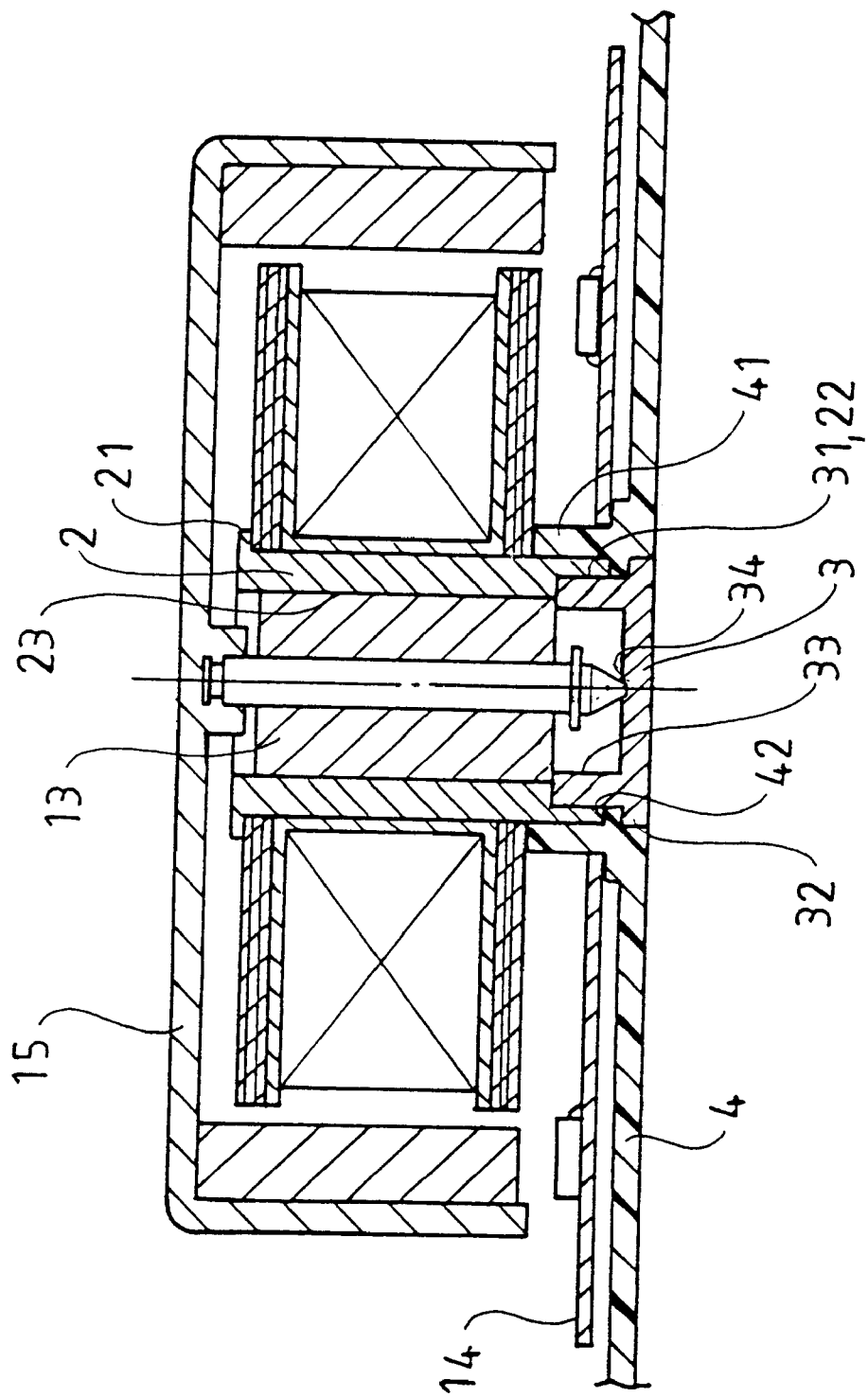
FIG. 6 is a sectional view of a motor with the fixing structure for an axle tube in FIG. 5.

FIGS. 5 and 6 illustrate a second embodiment of the invention, wherein the fixing structure for an axle tube in this embodiment includes a support member 4, an axle tube 2, and an end cap 3.

The support member 4 may be a casing for a heat-dissipating fan and made from plastic material. The support member 4 includes an upright tube 41 that is formed to be orthogonal to a plane on which the support member 4 locates. The tube 41 includes an inner flange 42 formed on an inner periphery thereof, the flange 42 being annular or arcuate.

The axle tube 2 and the end cap 3 are identical to those disclosed in the first embodiment. The axle tube 2 includes a flange 21, a relatively larger inner diameter portion 22, and a relatively smaller inner diameter portion 23. The end cap 3 includes a relatively smaller outer diameter portion 31, a relatively larger outer diameter portion 32, and an inner diameter portion 33. In addition, the end cap 3 includes a bottom that serves as a closed resting surface 34 on which the distal end of the shaft 16 of the rotor 15 rests.

The outer periphery of the axle tube 2 is tightly engaged with the inner periphery of the tube 41 by force fitting. An end face of the axle tube 2 abuts against an upper side of the flange 42 formed on the inner periphery of the tube 41. The relatively smaller outer diameter portion 31 of the end cap 3 extends through the flange 42 and is tightly engaged with the relatively larger inner diameter portion 22 of the axle tube 2. The relatively larger outer diameter portion 32 of the end cap 3 abuts against the lower side of the flange 42 of the tube 41. Thus, the flange 42 of the tube 41 is sandwiched between the end face of the axle tube 2 and the relatively larger outer diameter portion 32 of the end cap 3. In a case that an upper end face of the end cap 3 that abuts against the axle tube 2 is greater than an inner diameter portion 23 of the axle tube 2, the upper end face of the end cap 3 supports the bearing 13. The shaft 16 of the rotor 15 rests on the resting surface 34 of the end cap 3 to thereby allow stable rotation of the rotor 3.

The second embodiment of the invention can be applied to any conventional heat-dissipating fans to provide the advantages of easy assembly and easy manufacture. In addition, since the flange of the support member is sandwiched between the axle tube and the end cap, the longitudinal central axis of the axle tube is always orthogonal to the plane on which the support member locates regardless of heat expansion and shrinkage that lead to loosening of the axle tube.

According to the above description, it is appreciated that the axle tube and the end cap can be manufactured easily, and the axle tube and end cap made from the same material can be used to sandwich the support member. Thus, the longitudinal axis of the axle tube is always orthogonal to the plane on which the support member locates. As a result, the rotor rotates in a stable and non-tilt state without generating noise.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A fixing structure for an axle tube of a motor, the fixing structure comprising:

a support member including an assembly hole;

an axle tube including an outer diameter greater than a diameter of the assembly hole of the support member, the axle tube including an inner periphery having a relatively larger inner diameter portion in a first end thereof and a relatively smaller inner diameter portion in a second end thereof, the relatively larger inner diameter portion including an end face that abuts against the support member;

an end cap including an outer periphery having a relatively smaller outer diameter portion and a relatively larger outer diameter portion, the relatively smaller outer diameter portion of the end cap being extended through the assembly hole of the support member and engaged with the relatively larger inner diameter portion of the axle tube, the relatively larger outer diameter portion of the end cap having a diameter greater than the diameter of the assembly hole of the support member;

the axle tube abutting against a side of the support member and the relatively larger outer diameter portion of the end cap abutting against another side of the support member, thereby sandwiching the support member.

2. The fixing structure for an axle tube as claimed in claim 1, wherein the relatively smaller outer diameter portion of the end cap is in tight engagement with the relatively larger inner diameter portion of the axle tube.

3. The fixing structure for an axle tube as claimed in claim 1, wherein the relatively smaller outer diameter portion of the end cap has an inner diameter smaller than a diameter of the relatively smaller inner diameter of the axle tube.

4. The fixing structure for an axle tube as claimed in claim 1, wherein the axle tube includes a flange on the outer periphery thereof.

5. The fixing structure for an axle tube as claimed in claim 1, wherein the end cap includes a bottom that forms a closed resting surface.

6. A fixing structure for an axle tube of a motor, the fixing structure comprising:

a support member including a tube, the tube including an inner flange formed on an inner periphery thereof;

an axle tube including an outer periphery engaged in the tube of the support member, the axle tube including an end face that abuts against the inner flange, the axle tube further including an inner periphery having a relatively larger inner diameter portion in a first end thereof and a relatively smaller inner diameter portion in a second end thereof;

an end cap including an outer periphery having a relatively smaller outer diameter portion and a relatively larger outer diameter portion, the relatively smaller outer diameter portion of the end cap being extended through the inner flange of the tube of the support member and engaged with the relatively larger inner diameter portion of the axle tube, the relatively larger outer diameter portion of the end cap having a diameter greater than a diameter of the assembly hole of the support member;

the axle tube abutting against a side of the support member and the relatively larger outer diameter portion of the end cap abutting against another side of the support member, thereby sandwiching the support member.

7. The fixing structure for an axle tube as claimed in claim 6, wherein the relatively smaller outer diameter portion of the end cap is in tight engagement with the relatively larger inner diameter portion of the axle tube.

8. The fixing structure for an axle tube as claimed in claim 6, wherein the relatively smaller outer diameter portion of the end cap has an inner diameter smaller than a diameter of the relatively smaller inner diameter of the axle tube.

9. The fixing structure for an axle tube as claimed in claim 6, wherein the axle tube includes a flange on the outer periphery thereof.

10. The fixing structure for an axle tube as claimed in claim 6, wherein the end cap includes a bottom that forms a closed resting surface.

\* \* \* \* \*